United States Patent

Dunkl

[15] 3,646,403
[45] Feb. 29, 1972

[54] HIGH-VOLTAGE ELECTROLYTIC CAPACITOR

[72] Inventor: Franz S. Dunkl, Williamstown, Mass.

[73] Assignee: Sprague Electric Company, North Adams, Mass.

[22] Filed: Oct. 23, 1970

[21] Appl. No.: 83,568

[52] U.S. Cl. .............................. 317/230, 252/622
[51] Int. Cl. ........................................ H01g 9/00
[58] Field of Search ..................... 317/230, 231, 233

[56] References Cited

UNITED STATES PATENTS 2,965,690  12/1960  Petersen et al. .................. 317/230
3,138,746  6/1964  Burger et al. ..................... 317/230
3,302,071  1/1967  Stahr ............................... 317/230
3,351,823  11/1967  Jenny .............................. 317/230
3,504,237  3/1970  Stahr ............................... 317/230
3,509,425  4/1970  Jenny et al. ...................... 317/230
3,546,119  12/1970  Chesnat .......................... 317/230

Primary Examiner—James D. Kallam
Attorney—Connolly and Hutz and Vincent H. Sweeney

[57] ABSTRACT

An electrolytic capacitor suitable for operating at high voltages is produced by combining a glycol-borate electrolyte together with N-methyl pyrrolidone and a moderately hydrogen-bonding solvent. The electrolytic capacitor has a wide range of temperature conditions, operates at high voltages and retains stable electrical characteristics at these levels.

4 Claims, 1 Drawing Figure

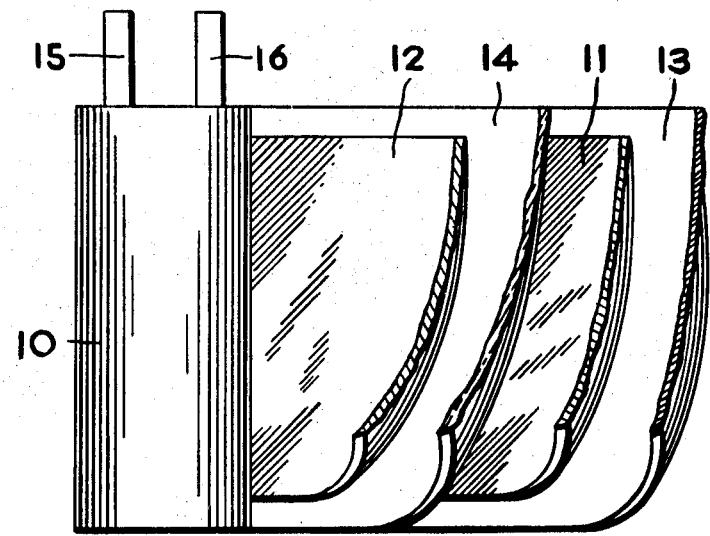

HIGH-VOLTAGE ELECTROLYTIC CAPACITOR

BACKGROUND OF THE INVENTION

This invention relates to high voltage electrolytic capacitors, and more particularly to a glycol-borate electrolyte containing hydrogen-bonding solvents.

Glycol-borate electrolytes have been used frequently in the past because of their many advantages. These advantages are well known in the art, but they have many disadvantages such as the fact that their voltage capability is limited to approximately 450 volts at 85° C. Additionally, the relatively high vapor pressure of aqueous electrolytes results in a loss of water and leads to changes in the characteristics of the capacitor. Such electrolytes are also known to adversely effect the anodic films of capacitor electrodes as, for example, due to hydration of the crystalline oxide film on aluminum electrodes. A common disadvantage of these electrolytes is a large increase in resistivity of the electrolyte at temperature extremes.

Attempts to overcome these and other disadvantages of aqueous electrolytic capacitors have been made with some success; see U.S. Pat. Nos. 3,351,823 and 3,302,071. The electrolytes contained therein have combined N-methyl pyrrolidone and butyrolactone. This combination, to some extent overcomes the disadvantages outlined above. However, these same electrolytes cannot operate about 450 volts because of scintillation and eventual breakdown.

Accordingly, it is an object of the present invention to increase the voltage capability of the capacitor, to extend the temperature range of glycol-borate electrolytes, and to maintain the resistivity at levels now found in the glycol-borate electrolytes.

SUMMARY OF THE INVENTION

The present invention is concerned with a standard glycol-borate electrolyte and the addition thereto of N-methyl pyrrolidone and a moderately hydrogen-bonding solvent. It has been found that the addition of N-methyl pyrrolidone to the standard mixture electrolyte reduces the water activity of same without destruction of the borate complex which is necessary for conductivity and forming ability. The further addition of a moderately hydrogen-bonding solvent, such as 2-methoxy ethanol, lowers the freezing point of the electrolyte, decreases the viscosity and consequently lowers the resistivity while retaining high voltage capabilities. This combination results in an electrolytic capacitor that has a capacity of 380 μf., a dissipation factor of 9 percent, and a leakage current of 1 milliamp at 500 volts and 105° C. At room temperature, these units had a leakage current of 0.1 milliamp at 500 volts and of 0.6 milliamp at 575 volts.

The electrolyte formulation of this invention that can be used at 500 volts and 105° C. has been found to be within the following ranges in percent by weight:

| | |
|---|---|
| Glycol | 30-45% |
| Ammonium pentaborate | 15-25% |
| Boric acid | 5-13% |
| Ammonium dihydrogen phosphate | 0-0.8% |
| N-methyl pyrrolidone | 15-20% |
| 2-methoxy ethanol | 15-20% |

BRIEF DESCRIPTION OF THE DRAWING

The FIGURE shows the rolled plates of an electrolytic capacitor.

DESCRIPTION OF THE PREFERRED EMBODIMENT

Referring to the FIGURE shown there is a capacitor assembly 10 having a pair of electrode foils 11 and 12 separated by spacer paper 13 and 14. Electrode tabs 15 and 16 are in electrical communication with foils 11 and 12.

The rolled foil-spacer-foil system is impregnated with the electrolyte. The convolutely wound capacitor section 10 is then inserted into a suitable container and sealed.

A life test was carried out on an electrolytic capacitor of the present invention whose electrolyte composition was as given in the following formulation wherein all parts are percent by weight:

| | |
|---|---|
| Glycol | 36.5% |
| Ammonium pentaborate | 19.4% |
| Boric acid | 9.4% |
| Ammonium dihydrogen phosphate | 0.1% |
| N-methyl pyrrolidone | 17.3% |
| 2-methoxy ethanol | 17.3% |

The life test was carried out on this capacitor at 500 v. DC and 105° C. and gave the following results:

| Hours on Test | Temperature (°C.) | Capacitance | Leakage Current at 25° C. |
|---|---|---|---|
| 0 | 105 | 390.2 μf. | 0.14 ma. |
| 504 | 105 | 382.8 μf. | 0.15 ma. |
| 1008 | 105 | 390.3 μf. | 0.09 ma. |

As was pointed out previously, capacitors impregnated with this electrolyte had a capacity of 380 microfarads, a dissipation factor of 9 percent and a leakage current of 1 milliamp at 500 volts and 105° C.

The electrolyte of the present invention has better properties than the previously employed solutions using nonaqueous solvents, as well as the standard glycol-borate electrolytes. For example, these electrolytes have the desirable property of broad temperature range of operation as well as the capability of operating at high voltage and high temperature atmospheres, while maintaining approximately the same resistivity levels. It should be emphasized at this point that the present invention is capable of operating at high voltages, while prior art attempts in this area have only been capable of operating efficiently below 450 volts.

While 2-methoxy ethanol is employed in the preferred embodiment of this invention as the moderately hydrogen-bonding solvent, it should be noted that other hydrogen-bonding solvents may be used with somewhat similar results. Hydrogen-bonding solvents will modify the properties of the resulting electrolyte; for example, to decrease the viscosity of the electrolyte or lower the freezing point thereof, or increase the boiling point therein. Obviously, by using these combinations one may alter or vary the temperature range, voltage capability and resistivity of the units.

Other moderately hydrogen-bonding solvents that can be used herein, with similar but less desirable results are: diethylene glycol monomethyl ether, 2-ethoxy ethanol, 3-heptanone, 2,6-dimethyl 4-heptanone, and 2-methoxyethyl acetate.

Also, in the preferred embodiment herein the 2-methoxy ethanol is present in the amount of 17.3 percent. This amount was chosen because although higher amounts contributed to higher voltage capabilities at the higher temperatures, it also caused a proportionately higher leakage current at room temperature. And amounts smaller than that preferred herein, resulted in proportionately lower voltages and higher resistivities. However, amounts around the 15-20 percent range can be used.

A 1:1 ratio is used herein for the N-methyl pyrrolidone and 2-methoxy ethanol; it was found that when other moderately hydrogen-bonding solvents were used, the ratio remained about the same for best results. The deciding factors considered therein are to keep the resulting boiling point high, the freezing point low, and the resistivity relatively low.

Butyrolactone has been employed in prior art electrolytes with N-methyl pyrrolidone, but it appears that butyrolactone is not as strong a hydrogen-bonding solvent as is needed to achieve the higher voltages. Also, although I do not wish to be bound by the following, it appears that the vapor pressure of butyrolactone, as compared with the hydrogen-bonding solvents disclosed herein, is relatively high and probably causes loss of electrolyte and a less efficient electrolyte.

When N-methyl pyrrolidone is used alone in a glycolborate electrolyte, the resistivity of the solution is too high to be efficient. This is one of the reasons for using a moderately hydrogen-bonding solvent.

The ionogen component used in the electrolyte mixture of the invention is generally present in relatively small amounts and ordinarily an amount thereof is employed which is sufficient to provide adequate resistivity of the electrolyte for the voltage applied to the capacitor in operation.

While the present invention has been described with reference to particular embodiments thereof it will be understood that numerous modifications may be made by those skilled in the art without actually departing from the scope of the invention. Therefore the appended claims are intended to cover all such equivalent variations as common within the true spirit and scope of the invention.

What is claimed is:

1. A high voltage electrolytic capacitor comprising a formed anode electrode of a valve metal, a cathode contact electrode, and a liquid electrolyte in contact with said electrodes, said electrolyte comprising a glycol, a borate, N-methyl pyrrolidone, and at least one moderately hydrogen-bonding solvent selected from the group consisting of 2-methoxy ethanol, diethylene glycol monomethyl ether, 2-ethoxy ethanol, 3-heptanone, 2,6-dimethyl 4-heptanone, and 2-methoxyethyl acetate.

2. The capacitor of claim 1 wherein said electrolyte includes ammonium dihydrogen phosphate and said borate is ammonium pentaborate.

3. The electrolytic capacitor of claim 2 wherein said electrolyte comprises a mixture in percent by weight of:

| | |
|---|---|
| Glycol | 30–45% |
| Ammonium pentaborate | 15–25% |
| Boric acid | 5–13% |
| Ammonium dihydrogen phosphate | 0–0.8% |
| N-methyl pyrrolidone | 15–20% |
| 2-methoxy ethanol | 15–20%. |

4. The electrolytic capacitor of claim 2 wherein said electrolyte comprises a mixture in percent by weight of:

| | |
|---|---|
| Glycol | 36.5% |
| Ammonium pentaborate | 19.4% |
| Boric acid | 9.4% |
| Ammonium dihydrogen phosphate | 0.1% |
| N-methyl pyrrolidone | 17.3% |
| 2-methoxy ethanol | 17.3%. |

* * * * *